(12) United States Patent
Liu

(10) Patent No.: US 7,875,106 B2
(45) Date of Patent: Jan. 25, 2011

(54) ADSORBENT AND ADSORBENT BED FOR MATERIALS CAPTURE AND SEPARATION PROCESSES

(75) Inventor: Wei Liu, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 195 days.

(21) Appl. No.: 12/136,129

(22) Filed: Jun. 10, 2008

(65) Prior Publication Data

US 2009/0293720 A1  Dec. 3, 2009

Related U.S. Application Data

(60) Provisional application No. 61/057,716, filed on May 30, 2008.

(51) Int. Cl.
*B01J 20/18* (2006.01)
*B01J 20/28* (2006.01)
*B01D 53/04* (2006.01)

(52) U.S. Cl. .................................. 96/153; 96/154
(58) Field of Classification Search .............. 96/108, 96/153, 154; 95/139, 900
See application file for complete search history.

(56) References Cited

U.S. PATENT DOCUMENTS

| | | | | |
|---|---|---|---|---|
| 2,038,071 | A | * | 4/1936 | Wilhelm ..................... 96/118 |
| 3,713,281 | A | * | 1/1973 | Asker et al. ................. 96/154 |
| 4,819,717 | A | * | 4/1989 | Ishikawa et al. ......... 165/104.12 |
| 5,352,274 | A | * | 10/1994 | Blakley ....................... 95/90 |
| 5,536,301 | A | * | 7/1996 | Lansbarkis et al. ........... 95/117 |
| 5,716,899 | A | | 2/1998 | Guile et al. |
| 5,750,026 | A | * | 5/1998 | Gadkaree et al. .......... 210/502.1 |
| 6,143,057 | A | | 11/2000 | Bulow et al. |
| 6,309,445 | B1 | | 10/2001 | Gittleman et al. |
| 6,387,159 | B1 | | 5/2002 | Butwell et al. |
| 6,508,863 | B1 | | 1/2003 | Byrne et al. |
| 6,537,348 | B1 | | 3/2003 | Hirano et al. |
| 6,572,681 | B1 | | 6/2003 | Golden et al. |

(Continued)

FOREIGN PATENT DOCUMENTS

EP  0955265  1/2005

(Continued)

OTHER PUBLICATIONS

Wang, H., et al., Nanostructured zeolite 4A molecular sieving air separation membranes, Chemical Communications, No. 16, Jul. 9, 2002, pp. 1708-1709.

(Continued)

*Primary Examiner*—Frank M Lawrence
(74) *Attorney, Agent, or Firm*—Derek H. Maughan

(57) ABSTRACT

A method device and material for performing adsorption wherein a fluid mixture is passed through a channel in a structured adsorbent bed having a solid adsorbent comprised of adsorbent particles having a general diameter less than 100 um, loaded in a porous support matrix defining at least one straight flow channel. The adsorbent bed is configured to allow passage of a fluid through said channel and diffusion of a target material into said adsorbent under a pressure gradient driving force. The targeted molecular species in the fluid mixture diffuses across the porous support retaining layer, contacts the adsorbent, and adsorbs on the adsorbent, while the remaining species in the fluid mixture flows out of the channel.

10 Claims, 6 Drawing Sheets

U.S. PATENT DOCUMENTS

| | | |
|---|---|---|
| 6,631,626 B1 | 10/2003 | Hahn |
| 6,974,496 B2 | 12/2005 | Wegeng et al. |
| 7,022,158 B2 * | 4/2006 | Seguin et al. .................. 95/90 |
| 7,066,986 B2 | 6/2006 | Haben et al. |
| 7,077,891 B2 * | 7/2006 | Jaffe et al. .................... 96/108 |
| 7,185,511 B2 | 3/2007 | Ryan et al. |
| 2005/0160913 A1 | 7/2005 | Hrycak et al. |
| 2005/0199124 A1 | 9/2005 | Little et al. |
| 2005/0265912 A1 | 12/2005 | Alvarez, Jr. et al. |
| 2006/0144227 A1 | 7/2006 | White et al. |
| 2006/0165574 A1 | 7/2006 | Sayari |
| 2006/0169142 A1 | 8/2006 | Rode et al. |
| 2006/0225569 A1 | 10/2006 | Schmidt et al. |
| 2006/0236863 A1 | 10/2006 | Weist, Jr. et al. |
| 2006/0266696 A1 | 11/2006 | Masuda et al. |
| 2007/0062369 A1 | 3/2007 | Pfenninger et al. |
| 2007/0151456 A1 * | 7/2007 | Ovshinsky et al. ............ 96/108 |
| 2007/0199448 A1 | 8/2007 | Yates et al. |

FOREIGN PATENT DOCUMENTS

| | | |
|---|---|---|
| EP | 1142622 | 6/2006 |
| EP | 1226860 | 9/2006 |
| EP | 1184067 | 11/2006 |
| EP | 1293249 | 11/2006 |
| EP | 1245266 | 1/2007 |
| EP | 1095690 | 4/2007 |
| WO | 2005039739 | 5/2005 |
| WO | 2005061100 | 7/2005 |
| WO | 2007000960 | 1/2007 |

OTHER PUBLICATIONS

Tago, T., et al., Preparation of hydrophilic silicalite-1 nanocrystal-layered membrane for sepration of water from water-acetone solution by pervaporation, Separation and Purification Technology, 58, 2007, pp. 7-11.

Madhusoodana, C. D., et al., Preparation of ZSM-5 thin film on cordierite honeycomb by solid state in situ crystallization, Microporous and Mesoporous Materials, 46, 2001, pp. 249-255.

Okada, K., et al., Preparation of zeolite-coated cordierite honeycombes prepared by an in situ crystallization method, Science and Technology of Advanced Materials, 5, 2004, pp. 479-484.

Janssen, L. P. B. M., et al., Transport Phenomena Data Companion, Hydraulic Diameters, Jan. 1, 1987, Transport Phenomena Data Companion, Delftse Uitgevers Maatschappij B. V., Delft, The Netherlands, p. 86.

Communication Relating to the Results of the Partial International Search, pp. 1-3.

* cited by examiner

|  | Absorption Time*, min | Desorption Time*, min | $CO_2$ Capacity After Exposed to Ambient Air |
|---|---|---|---|
| Convention Packed Bed with UOP 13X Adsorbent Bead 1.3mm | 4 | 6 | ~1.0 wt% |
| Commercial 13X Powder in Micro-Structure Form (~1mm thickness) | 3 | 4 | ~0.0 wt% |
| In-house nano-ZSM5 Powder in Micro-Structure Form (~1mm thickness) | 0.8 | 1.9 | ~5.0 wt% |

Fig. 4

ADSORBENT AND ADSORBENT BED FOR MATERIALS CAPTURE AND SEPARATION PROCESSES

CLAIM TO PRIORITY

This application claim priority from a Provisional Patent Application No. 61/057,716, having the same inventor and filed May 30, 2008. The contents of which are herein incorporated by reference in their entirety.

FEDERALLY-SPONSORED RESEARCH AND DEVELOPMENT

This invention was made with Government support under Contract DE-AC0576RLO1830 awarded by the U.S. Department of Energy. The Government has certain rights in the invention.

BACKGROUND OF THE INVENTION

1. Field of the Invention

The invention generally relates to mass transfer processes and more particularly to methods and devices for performing mass transfer including capturing and adsorbing substances.

2. Background Information

The utilization of mass transfer processes to perform various process steps in manufacturing is a key feature in many technological areas. For example, adsorption of a material over a solid adsorbent is one common unit separation process that is widely used in various industries. One basic problem with many of these processes is the quantity of mass transfer throughout and hydrodynamic limitations. The steps that must be undertaken in many instances over come these limitations significantly reduces the efficiency of such processes, and in some instances create additional problems that must be dealt with. For example, in some applications reducing particle sizes to attempt to increase surface area for activity, drastically increases the pressure drop, which in turn requires more energy to raise the pressure again to operate the process. Thus, in some applications the cost of operating the system may render the system too expensive to justify its use.

In other embodiments, various engineering steps taken to over come these shortcoming may so reduce the effective throughput of the system so as to render the process too slow for effective or widespread implementation. These problems are particularly pronounced when the adsorption is used to deal with a large volume of process streams or to conduct separation problems wherever energy efficiency becomes critical. This is a particular problem in process such as carbon dioxide capture and sequestration wherein effective means to reduce pollutants and increase efficiency are of major global import. The other adsorption-related applications include air separation for production of O2 or N2, water removal from process streams, removal of pollutants from process streams to be discharged into environments, and industrial process separation.

What is needed therefore is a system and method for performing mass transfer processes such as adsorption and capture that offers a solution to these long-term dilemmas, and offers an efficient (both capital and energy) and useful method for performing these functions. The present invention meets these needs.

Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY

The present invention is a method device and system for performing mass transfer operations such as adsorption and capture through a structured adsorbent bed. In one embodiment, the adsorbent bed includes a solid adsorbent loaded in a porous support matrix that consists of a number straight flow channels. In use, a fluid mixture is passed through the channels under a pressure gradient driving force. The targeted molecular species in the fluid mixture diffuse across the porous support retaining layers, get into contact with the adsorbent, and adsorb on the adsorbent, while the remaining species in the fluid mixture flow out of the channel intact. The adsorbed species can be desorbed by heating up the adsorbent bed, depressurizing the adsorbent bed, or passing a purge fluid through the channel.

Depending upon the particular embodiments and necessities of a particular user, the present invention can be alternatively altered and designed in a wide variety of circumstances. These include, but are not limited to, gaseous mixtures, liquid-phase mixture or mixed phase mixtures. These include, but are not limited to treatment of combustion flue gas, gasification syngas, water-alcohol mixtures, organic-water mixtures, air separation, and other applications where the advantages of the present invention are desired.

Depending upon the needs and necessities of the user, various materials may be utilized as a part of the solid adsorbent. In some embodiments the solid adsorbent provides selective adsorption function and may be configured from inorganic (such as zeolite), organic (polymeric resin) or hydride materials (organic metallic). In some embodiments, the invention is a structured adsorbent bed having a solid adsorbent comprised of adsorbent particles having an average diameter less than 100 um, loaded in a porous support matrix defining at least one straight flow channel. The adsorbent bed configured to allow passage of a fluid through said channel and diffusion of a target material into the adsorbent. In some embodiments these adsorbent particles have a general diameter of less than 1 um, and in some applications these adsorbent particles are nanocrystals having a general diameter of less than 500 nm, and in some applications a general diameter between 10-500 nm. Depending upon the exact needs and necessities of the user, these devices may be generally uniform and have varying pore sizes of various configurations so as to obtain a desired level of kinetics. In some applications, a zeolite material is combined with an alkali, alkali earth, rare earth, and transition metal or their mixture, preferably within the channels of nanocrystalline zeolite crystals having a size smaller than 1 um. Examples of such materials include a nanocrystalline zeolite crystal such as ZSM5 combined with an alkali earth metal such as Na and/or Li. In some applications, the adsorbent material is a zeolite of high Si/Al ratio, such as, silicalite, M-ZSM-5, dealuminated M-Y (where M is the metal modifier including Li, Na, Mg, Ca, La, Ce). Some embodiments allow CO2 capture in a residence time of less than 1 second and/or CO2 capture at a pressure drop less than 1 bar.

In some embodiments, the channel of the device has a hydraulic diameter from about 0.3 to 10 mm. The solid adsorbent may be loaded to a thickness of less than 10 mm, in some cases less than 3 mm. The porous support has a mean pore size between 0.05 um to 100 um and a porosity of between 25 to 90%, and in some applications comprise a porous support retaining layer having a thickness of between 1 um to 500 um. This porous support retaining layer may be made from any of a variety of materials, including those selected from the group consisting of metals, ceramics and combinations thereof in a physical structure such as honeycomb, sheet, or plate. By passing a fluid mixture through a channel in such a structured adsorbent bed, as the fluid mixture flows pass through the channel, the targeted molecular species in the fluid mixture will diffuse across the porous support retaining layer, contact the adsorbent, and adsorb on the adsorbent, while the remaining species in the fluid mixture flows out of the channel. Examples of potential target materials include, but are not limited to $CO_2$, $H_2O$, $O_2$, $N_2$, sulfur compounds, chlorine compounds, Hg compounds, hydrocarbons and combinations thereof.

In one particular embodiment utilized for $CO_2$ capture, the structured adsorbent bed includes nanocrystallized zeolite-alkali earth metal adsorbent particles having a general diameter less than 500 nm, loaded in a porous support matrix defining at least one straight flow channel, said adsorbent bed configured to allow passage of a fluid through said channel and diffusion of a target material into said adsorbent. In some embodiments the combination of NaZSM-5 and silicalite has been shown to be effective for $CO_2$ adsorption in presence of moisture. In addition, in some embodiments the solid adsorbent is loaded to a thickness of less than 3 mm, the porous support has a mean pore size between 1 to 30 um and a porosity of between 25 to 60%. The present invention in some embodiments enables $CO_2$ capture in a $CO_2$-containing gas mixture in a residence time of less than 1 second, and/or at a gas superficial linear velocity of 1 cm to 20 m/s and pressure drop less than 1 bar.

While these preferred descriptions of various embodiments of the invention has been given, it is to be distinctly understood that the invention is not limited thereto but may be variously configured and embodied according to the needs and necessities of the user. The adsorbent bed comprises a solid adsorbent being loaded into a porous support matrix that consists of a number straight flow channels. The adsorbent bed allows use of fine solid adsorbent particles and minimizes both internal and external mass transfer resistance in an adsorption process while maintaining a low pressure drop for the fluid to pass through at the same time. The invention enables operation of adsorption separation at a throughput or efficiency dramatically higher than the conventional adsorption process. The invention can be used for a range of existing and future adsorption-based separation problems, such as, $CO_2$ capture from flue gas, drying of process streams, water-alcohol separation, hydrogen gas purification, etc.

In some embodiments of the present invention, the solid adsorbent comprises a zeolite material that has been combined with an alkali and alkali earth metal. In particular applications, such as $CO_2$ capture, this has shown to be an effective combination and can be formed by reacting a zeolite such as ZSM-5 powder with an alkali earth metal is Na, through a reaction such as ion transfer. The resulting product comprises NaZSM-5 and silicalite and when combined in a bed loaded to a thickness of less than 3 mm, the porous support has a mean pore size between 1 to 30 um and a porosity of between 25 to 60%, the system enables $CO_2$ capture in a residence time of ~0.1 s, and at a heat of adsorption of 10~30 kj/mol, which are significantly better than prior art methods.

Adsorption with these devices is performed by passing a fluid mixture through a channel in such a structured adsorbent bed, the fluid passes through the channel under a pressure gradient driving force and the target material diffuses into the adsorbent under a chemical potential gradient driving force. The targeted molecular species in the fluid mixture then diffuses across the porous support retaining layer, contacts the adsorbent, and adsorbs on the adsorbent, while the remaining species in the fluid mixture flows out of the channel. Pluralities of these devices may then be combined to form various flow reactor systems which in combination provide a variety of advantages to the user.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, I have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

BRIEF DESCRIPTION OF THE DRAWINGS

FIG. 4 is a table showing comparative results of the present invention against another prior art embodiment.

DETAILED DESCRIPTION OF A PREFERRED EMBODIMENT

The following description includes the preferred best mode of one embodiment of the present invention. It will be clear from this description of the invention that the invention is not limited to these illustrated embodiments but that the invention, also includes a variety of modifications and embodiments thereto. Therefore, the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Figures 1A, 1B:
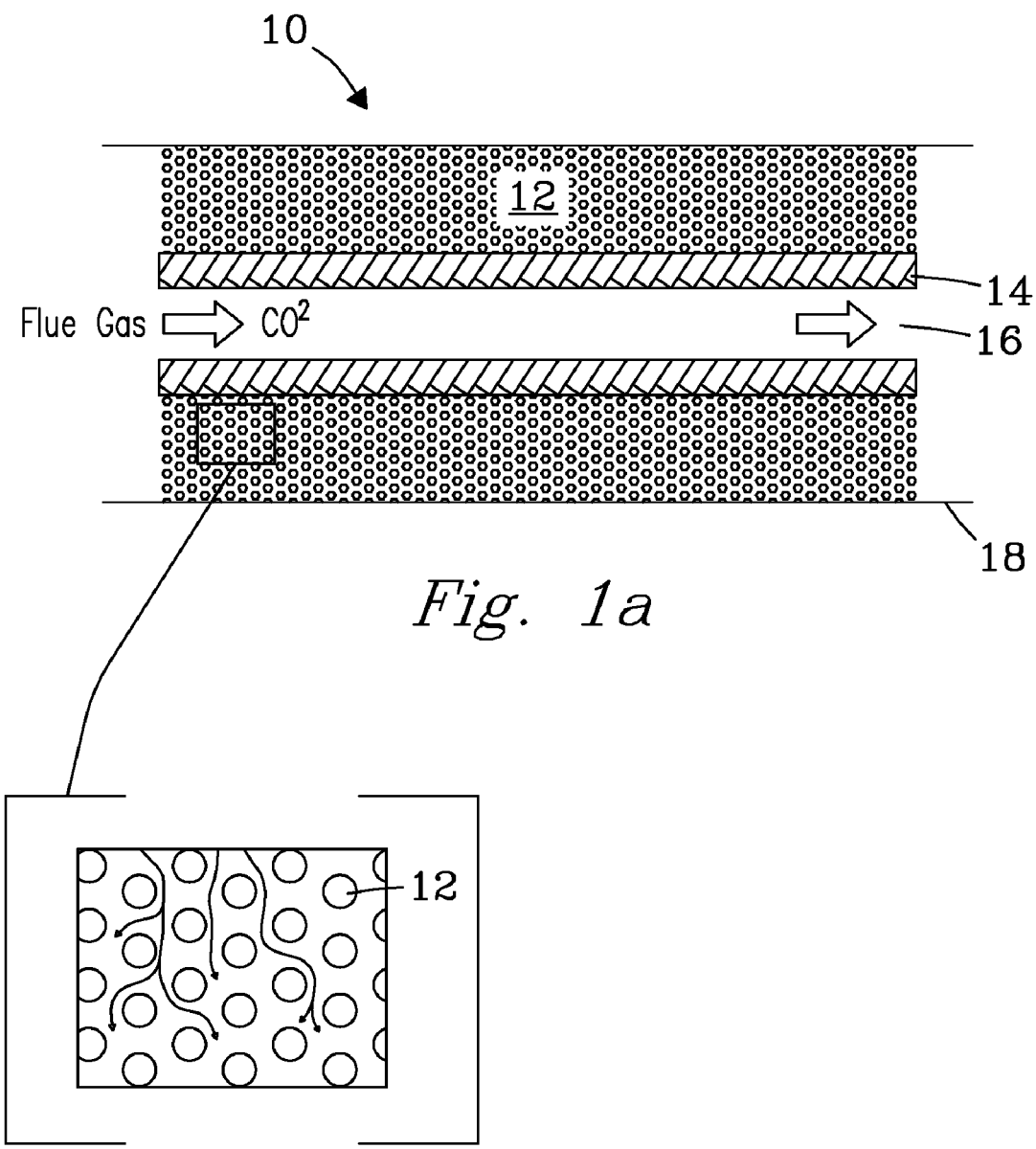
FIG. 1A is a schematic side view of one embodiment of the present invention.
FIG. 1B is a schematic detailed view of a portion of the embodiment shown in FIG. 1A.

In this one preferred embodiment, the invention is utilized in an embodiment for $CO_2$ capture. While this particular embodiment is shown, it is to be distinctly understood that the invention is not limited thereto, but may be variously arranged and configured in accordance with the various needs and necessities of the user. This includes, but is not limited to, various other types of adsorption and capture of various other types of materials. Referring first to FIGS. 1-4, a first view of one embodiment of the present invention is shown. FIG. 1A shows the structured adsorbent bed 10 which includes a solid adsorbent 12 loaded in a porous support matrix 14 that consists of a number straight flow channels 16. In use a fluid mixture, a flue gas in this particular embodiment, is passed through the channel under a pressure gradient driving force, and the targeted molecular species ($CO_2$) in the fluid mixture diffuses across the porous support 14 contacts the adsorbent particles 12, and adsorb on to these particles 12, while the remaining species in the fluid mixture flows out of the channel intact. Detailed view of this diffusion is shown in FIG. 1B. The adsorbed species ($CO_2$) then be later desorbed by heating up the adsorbent bed, depressurizing the adsorbent bed, or passing a purge fluid through the channel.

Figure 1C:
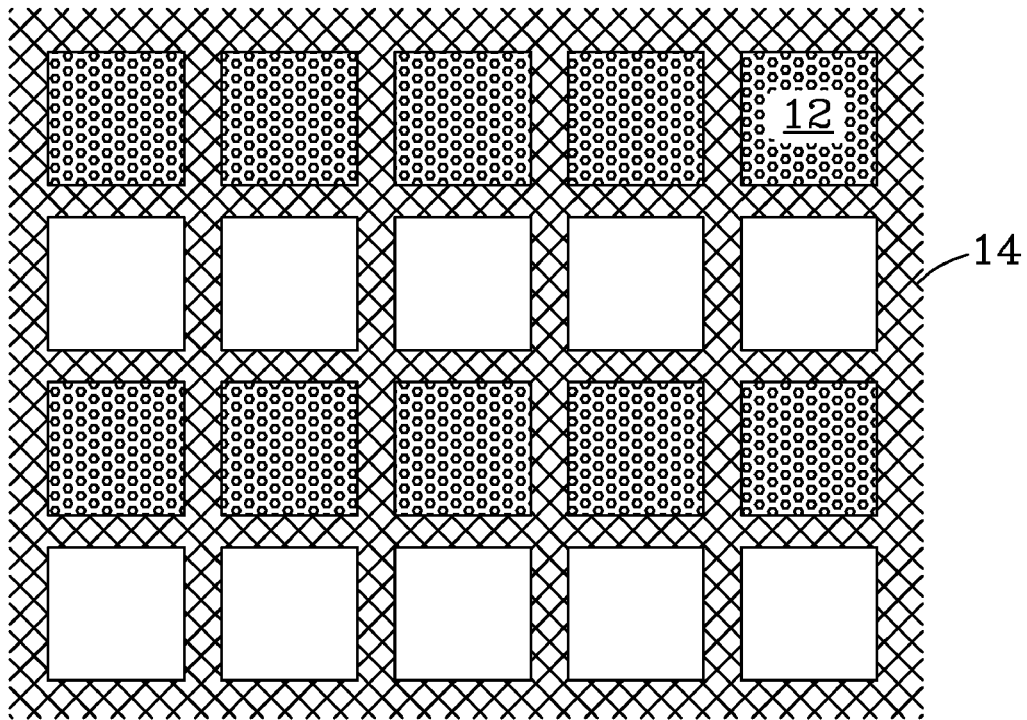
FIG. 1C is a view of one configuration of one embodiment of the present invention.
Figure 1D:
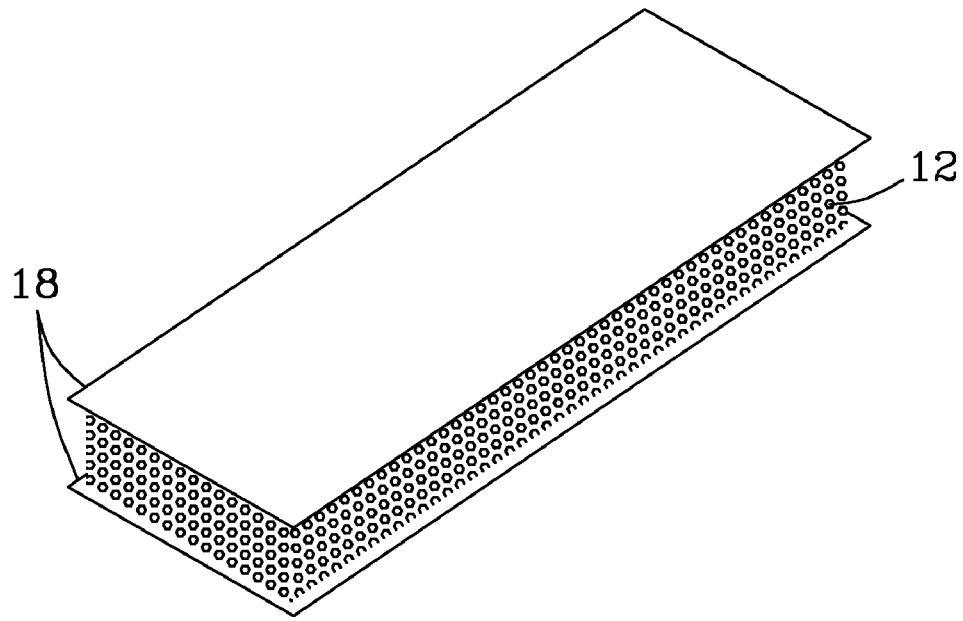
FIG. 1D is a view of another configuration of one embodiment of the present invention.

The support material is preferred chemically and thermally stable, and mechanically rugged. The channel size is, preferably in 0.3 to 3 mm. The thickness of the solid adsorbent loading is preferably less than 3 mm, less than 1 mm more preferably. In general, the porous support 14 should be as permeable as possible while maintaining adequate mechanical strength to hold the adsorbent particle in place during frequent adsorption/desorption operation process. The mean pore size and porosity of the porous support is preferred to be about 1 to 30 um and 25 to 60%. The thickness of the porous support retaining layer 18 is preferred from 1 to 500 um. The porous support matrix 14 is preferably made of stable metallic or ceramic materials, such as porous ceramic monolith. These adsorbent beds can then be arranged in a variety of configurations. In one configuration, these adsorptive nanoparticles are sandwiched between layer of a porous supporting structure and the edges are sealed. These sandwiched pieces can then be stacked to form an absorptive bed. In another embodiment these nanoparticles can be arranged in a ceramic honey comb configuration, in alternating channel configuration for pack the absorbent. Either of these configurations can then be used to pack the channels of the device. Straight channels have been preferred because they limit the amount of dead volume, reduce energy consumption and provide higher throughput, by requiring reduced pressure, reduced energy consumption, reduced pressure and increasing the kinetics. Such a configuration also provides for easier clean out of the device. Examples of various configurations are shown in FIGS. 1C and 1D.

Figure 2A:
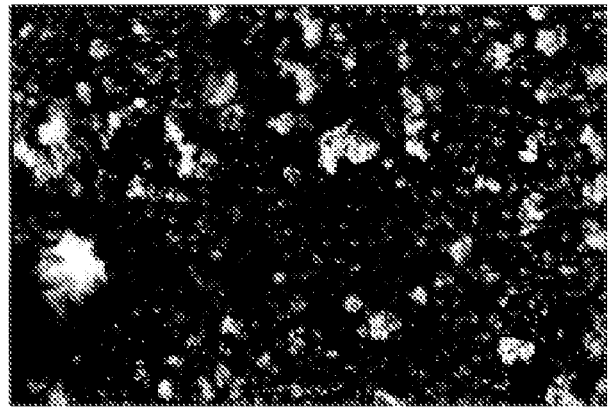
FIG. 2 shows various photographs of the solid adsorbent materials in one embodiment of the present invention.
Figure 2B:
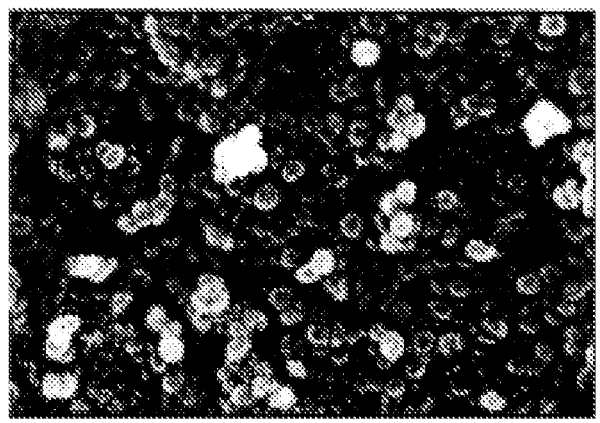
Figure 2C:
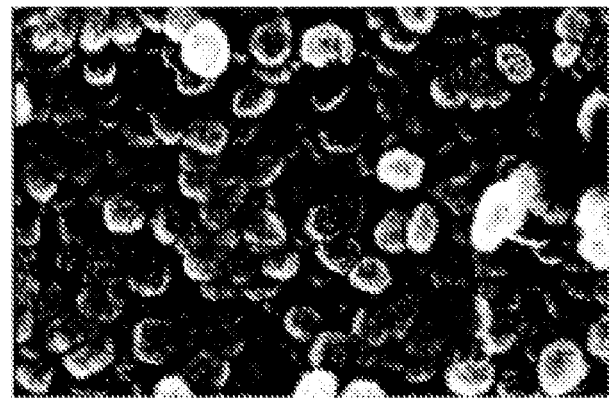

The solid adsorbent material of the present invention may be variously configured according to the needs and necessities of a particular user. In one embodiment of the present invention, nanocrystallized NaZSM-5 and silicalite having particulate sizes of less than 500 nm s demonstrated the highest $CO_2$ adsorption capacity with minimal $H_2O$ adsorption. Thus providing a substantial and significant advantage over the prior art embodiments. These materials in combination with the aforedescribed adsorbent bed enabled rapid mass and heat transfer-a step change in the adsorption with lower capital and energy cost. Photomicrographs of these particles are shown in FIG. 2 and comparative results are shown in FIG. 4. While this particular embodiment has been shown and described it is to be distinctly understood that the invention is not limited thereto, but may be variously embodied and configured according to the needs and necessities of the user.

Figure 3A:
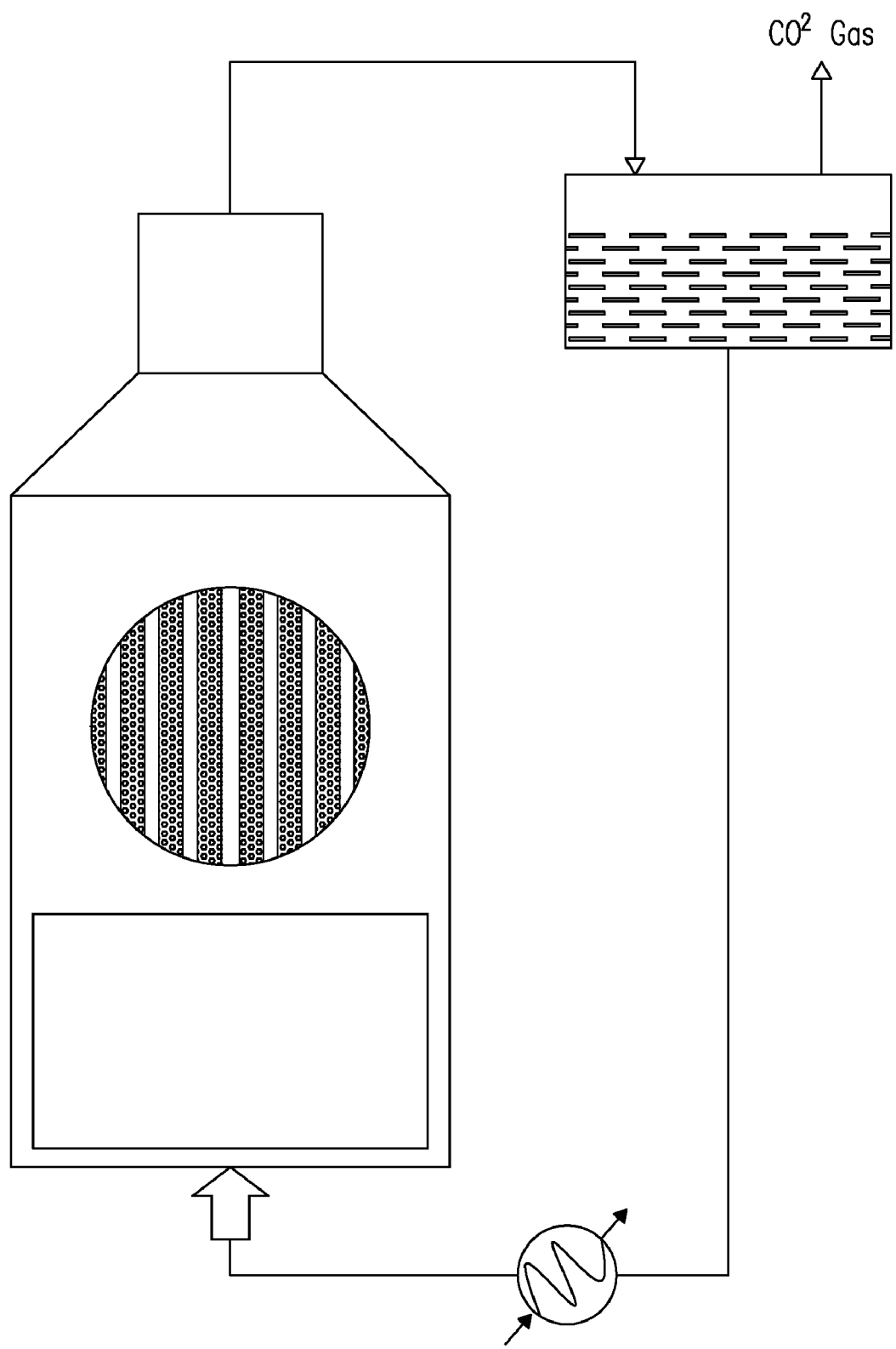
FIGS. 3A and 3B show various reactor configurations utilizing the example of the present invention.
Figure 3B:
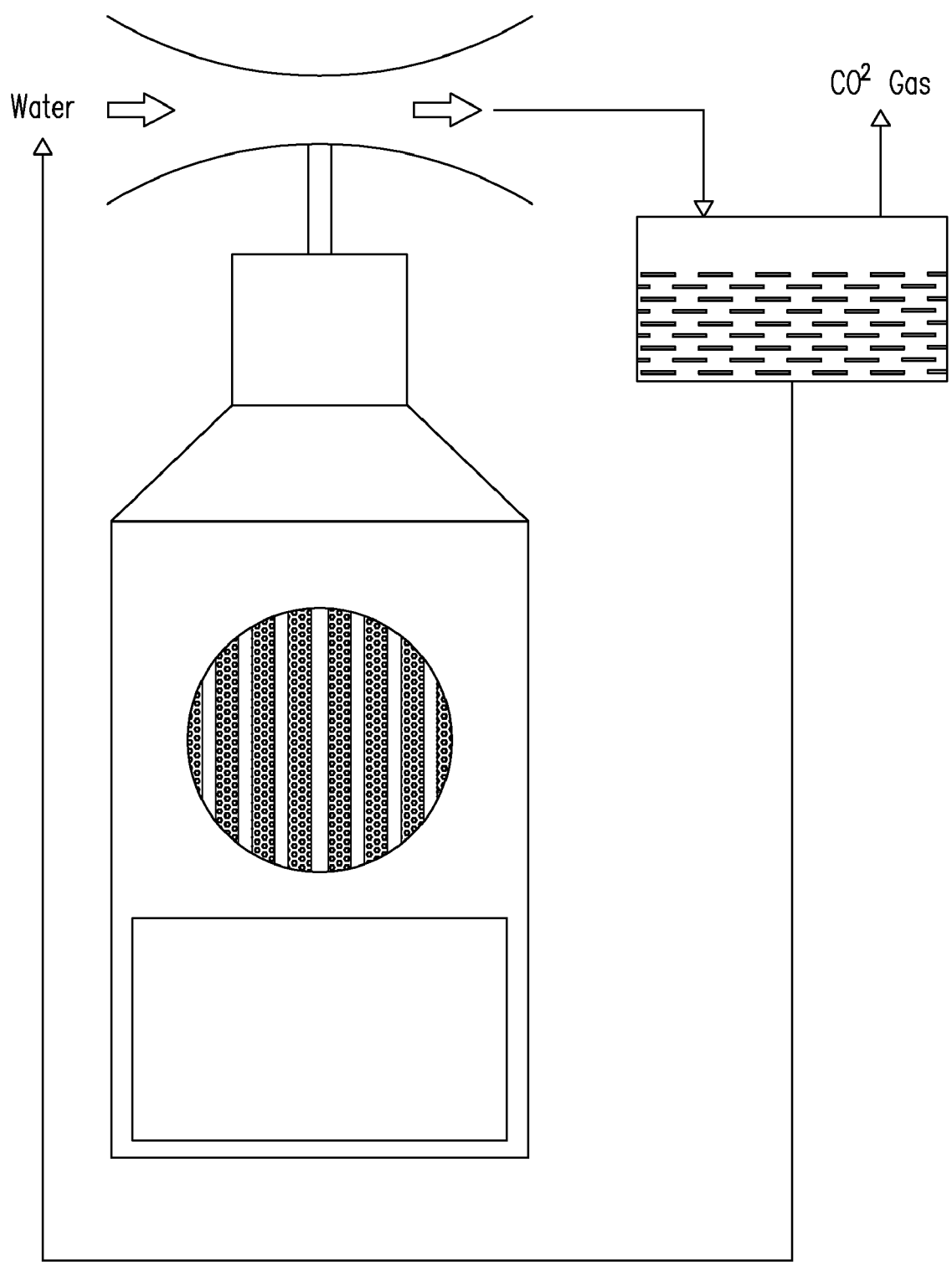

The present invention allows use of fine solid adsorbent particles and minimizes both internal and external mass transfer resistance in an adsorption process while maintaining a low pressure drop for the fluid to pass through at the same time. It is known that pore diffusion rate in a particle rapidly increases with decreasing the particle size. Packing fine adsorbent particles in the porous support structure without use of a binder creates larger pore sizes in the packed particle layer than the conventional extruded adsorbent pellets where the binders are often used in the extrusion process. As a result, mass transfer rates in all the elemental steps, from the channel bulk flow, channel wall, adsorbent packing layer, to inside of the adsorbent particle, are all enhanced by use of appropriate channel size and channel flow linear velocity, thickness and pore structures of the supporting material, adsorbent packing thickness, and adsorbent particle size. The straight flow channel provides low pressure drop and little dead volume so that the fluid can be rapidly introduced into the adsorbent bed and rapidly discharged, which resembles a plug flow pattern. The enhanced mass transfer rates and plug flow hydrodynamics enables operation of adsorption separation at a throughput or efficiency dramatically higher than the conventional process by conducting rapid adsorption and regeneration. These bed and adsorbent configurations can be used for a range of existing and future adsorption-based separation problems, such as, $CO_2$ capture from flue gas, drying of process streams, water-alcohol separation, hydrogen gas purification, etc. Examples of various potential flow reactor stream processing devices are shown in FIGS. 3A and B.

This present invention includes the ability to obtain molecular separation based on slight difference in size, structure, and/or shape, proven chemical and thermal stability, potential low-cost, large-scale manufacturability. Estimated calculations demonstrate that for example the embodiment of the invention related to $CO_2$ capture would enable a 500 MWe power plant to operate under the following conditions and parameters:

| | Proposal | MEA absorption |
|---|---|---|
| Adsorbent bed volume: | ~1000 m3 | |
| Adsorbent weight: | ~500 ton | |
| Adsorption/regeneration cycle time: | ~5 min | |
| Capital cost, $/KWe: | ~150 | 792~950 |
| Energy cost, % coal feed: | ~13% | 28~35% |

MEA adsorption is an amine solvent-based absorption process for scrubbing $CO_2$ out of flue gas. Significant reduction to capital and energy cost by use of the adsorbent bed technology of present invention is due to simplified process flow diagram, compact adsorption vessel, and decreased regeneration energy consumption.

While various preferred embodiments of the invention are shown and described, it is to be distinctly understood that this invention is not limited thereto, but may be variously embodied to practice within the scope of the following claims. From the foregoing description, it will be apparent that various changes may be made without departing from the spirit and scope of the invention as defined by the following claims.

What is claimed is:

1. A flow reactor system for adsorption and desorption characterized by
   a structured adsorbent bed comprising a solid adsorbent having nanocrystallized zeolite-alkali earth metal adsorbent particles having a general diameter less than 500 nm, loaded in a porous support matrix defining at least one straight flow channel, said adsorbent bed configured to allow passage of a fluid through said channel and diffusion of a target material into said adsorbent.

2. The structured adsorbent bed of claim 1 wherein said adsorbent material comprises NaZSM-5 and silicalite.

3. The structured adsorbent of claim 1 wherein the solid adsorbent is loaded to a thickness of less than 3 mm, the porous support has a mean pore size between 1 to 30 um and a porosity of between 25 to 60%.

4. The structured adsorbent bed of claim 1 wherein said structured adsorbent bed enables CO2 capture in a CO2-containing gas mixture in a residence time of less than one second.

5. The structured adsorbent bed of claim 4 wherein said structured adsorbent bed enables CO2 capture at a gas superficial linear velocity of 1 cm to 20 m/s and pressure drop less than one bar.

6. A structured adsorbent bed comprising
a solid adsorbent comprised of adsorbent hydride particles having an average diameter between 10 and 500 nms, loaded in a porous support matrix defining at least one straight flow channel, said adsorbent bed configured to allow passage of a fluid through said channel and diffusion of a target material into said adsorbent.

7. The structured adsorbent bed of claim 6 wherein said channel has a hydraulic diameter from about 0.3 to 10 mm.

8. The structured adsorbent bed of claim 6 wherein said solid adsorbent is loaded to a thickness of less than 10 mm.

9. The structured adsorbent bed of claim 6 wherein said solid adsorbent is loaded to a thickness of less than 3 mm.

10. The structured adsorbent bed of claim 6 wherein said porous support has a mean pore size between 0.05 um to 100 um and a porosity of between 25 to 90%.

* * * * *

UNITED STATES PATENT AND TRADEMARK OFFICE
CERTIFICATE OF CORRECTION

PATENT NO. : 7,875,106 B2
APPLICATION NO. : 12/136129
DATED : January 25, 2011
INVENTOR(S) : Wei Liu Page 1 of 1

It is certified that error appears in the above-identified patent and that said Letters Patent is hereby corrected as shown below:

column 6 line 20 please insert the word --adsorption-- between the words conventional and process Signed and Sealed this
Twenty-sixth Day of April, 2011

David J. Kappos
*Director of the United States Patent and Trademark Office*